United States Patent [19]
Otzen

[11] Patent Number: 6,119,714
[45] Date of Patent: Sep. 19, 2000

[54] VALVE CAP WITH PRESSURE INDICATING LABEL

[76] Inventor: Karl G. Otzen, P.O. Box 1056, Lake Geneva, Wis. 53147

[21] Appl. No.: 09/290,787

[22] Filed: Apr. 12, 1999

[51] Int. Cl.[7] .................................................. B60C 23/00
[52] U.S. Cl. ............................ 137/232; 116/34 R; 40/332
[58] Field of Search ..................................... 137/232, 227; 116/34 R; 40/311, 331, 332

[56] References Cited

U.S. PATENT DOCUMENTS

| | | | |
|---|---|---|---|
| 3,177,724 | 4/1965 | Trinca . | |
| 3,889,530 | 6/1975 | Bluem . | |
| 4,004,614 | 1/1977 | Mackal et al. | 137/232 X |
| 4,239,184 | 12/1980 | Dudar | 137/232 X |
| 4,545,246 | 10/1985 | Starmer . | |
| 4,827,643 | 5/1989 | Hearst et al. . | |
| 5,569,849 | 10/1996 | Cummings | 116/34 R X |
| 5,641,902 | 6/1997 | Hong | 116/34 R X |
| 6,000,159 | 12/1999 | Hornung | 40/311 X |
| 6,052,929 | 4/2000 | Canadas | 40/331 |

*Primary Examiner*—John Rivell
*Assistant Examiner*—Meredith H. Schoenfeld
*Attorney, Agent, or Firm*—James T. FitzGibbon; Vedder, Price, Kaufman & Kammholz

[57] ABSTRACT

A valve cap for an installation having interior air pressure. The cap includes an upper sleeve portion with a central recess for receiving a pair of pressure indicating inserts. The inserts are received in the recess, and each displays one digit of a desired inflation pressure on its upper surface. The inserts also have a formation thereon which enable them to be snapped snugly in place within the recess. Other embodiments include a tray nesting with the inserts. A single insert is also taught.

17 Claims, 3 Drawing Sheets

SIDE ONE
OF NUMBER CARD

SIDE TWO
OF NUMBER CARD
TAKEN FROM
SIDE ONE

VALVE CAP WITH PRESSURE INDICATING LABEL

BACKGROUND OF THE INVENTION

The present invention relates generally to labeling devices and, more particularly, to air pressure labeling devices for valve stem caps.

With the advent of a large variety of automobile tires, there is now a large variation in the recommended air pressure to be used in such tires. For example, there is a large number of automobile tires which require different inflation pressures. Moreover, there are tires on other vehicles which range from ATV and motorcycle tires that require 3 to 10 psi up to motorcycle tires which require up to 45 psi or higher.

There are many utility vehicles that require either much higher or much lower pressures than those customarily encountered in automobile tires. For example, there are tires to be inflated on various lawn, garden and agricultural tractors, on "Bobcats" or like small loading devices, and there is a large variety of medium duty to heavy duty trucks with over the road tires on them that require up to 80 psi or more. The importance of proper air pressure cannot be overemphasized. Unless tire pressure is proper, maximum fuel efficiency cannot be obtained. Tire pressure is important to safe handling and of course, tire safety and wear. A tire that is under inflated cannot meet warranty inspection as to mileage.

Most importantly, dealer shops do not always take care in inflating tires to the desired pressure. Ordinarily, a majority of such shops merely inflate auto tires to one pressure and truck tires to another pressure. Because service intervals between lubrication have been extended from 1,000 or 2,000 miles to 3,000 to 7,500 miles, the consequences of improper tire pressure can be appreciated. A tire which is thus under-inflated may be driven for the longer interval without proper pressure adjustments. The foregoing are merely exemplary of the wide variety of applications that exist. In addition, there are storage tanks and other devices for air which may initially be inflated to a certain pressure, such as portable and fixed air supply tanks or the like, self-contained underwater breathing apparatus ("scuba") tanks, and many other applications which are known to those skilled in the art.

With the large variety of applications encountered by a typical user, it is thought that a ready reminder of the applicable pressures should be able to be easily seen at the most convenient point, namely right at the inflation valve itself. This avoids the difficulty of rummaging through the glove compartment or looking on the "B" pillar of an automobile or other inconsistent location in order to obtain this information. After looking in one or more places, a person is tempted not to continue the search. Often, after-market tires differing in width and/or in rim size from the OEM tires also require different pressures, thus making information in the owner manual obsolete or misleading. The individual user may himself have a preference for inflation pressures which are either greater or less than that originally specified for the application.

Accordingly, it is an object of the present invention to provide a labeling device for a valve cap which would carry a highly visible reminder of the exact inflation pressure to be used in that particular application.

Another object of the invention is to provide a form of labeling which is easy to install, and once installed, requires little or no maintenance.

Yet another object of the invention is to provide a valve cap wherein the valve cap maintains its integrity and on which the indicated air pressure is kept on a cap which, although separately manufactured, is easily installed.

Still another object of the invention is to provide a flag or other element which is separate from, but integrated in use with the air pressure indicator, and which may contain advertising or like material, or indicate units (Kpa, psi, Bar) of pressure to be applied.

A still further object is to provide a cap which will seal out dust and water as well as or better than existing caps.

Another object of the invention is to provide, in some embodiments, a tether for the valve cap so that it will not be lost or associated with another tire.

A further object of the invention is to provide a flag or like vertical extension of the tray or the like which is adapted to carry the elements on which the indicated air pressure is displayed, or optionally, an advertising message.

A still further object of the invention is to provide a space on the lower portion of a composite cap which includes a band encircling the cap to carry the name of the tire maker or other advertising message, or in the alternative, which may carry the units in which the inflation pressure is measured, such as psi, bar, or Kpa (kilo pascals).

An additional object of the invention is to provide a cap bearing inflation information which cap may be installed in the same way as a regular cap once the tire pressure legend has been inserted therein.

Another object of the invention is to provide a cap with a multi-piece insert, with two of the pieces each containing a digit of the desired pressure to be contained in the application.

Yet another object of the invention is to provide a multi-piece assembled cap wherein the flag or like part of the insert portion may be rotated as desired to provide maximum visibility to the desired pressure reminder, and which will inherently serve as a torque-limiting device when used as a turning handle or aid and which is also handy in removing the cap.

Still another object of the invention is to provide a multi-piece arrangement, including a tray piece constructed and arranged to carry the remaining portions of a multi-piece insert bearing an indication of pressure and which tray eases the task of initial assembly.

A further object of the invention is to provide a light-weight valve cap which by reason of its light weight, will have a minimal effect on wheel and tire balance.

A still further object is to provide a simplified system of tire pressure marking, preferably using a one-piece insert premarked with a desired pressure, and which therefore may be incorporated advantageously and at low cost by the manufacturer for OEM applications.

An additional object of the invention is to provide an after-market device which, by reason of the arrangement of its parts, can incorporate any number of pressures from 1 psi to 99 psi using only two button-like inserts which are suitably prepared in conjunction with a tray member.

The present invention achieves its objects by providing a modified valve stem cap wherein an insert for the valve cap is adapted to indicate the pressure which is to be contained in the application. Other embodiments include a modified cap with a center tray-like insert and two companion inserts which may be snapped into a recess on the valve cover as a unit, with the two inserts each containing one numeral of the desired pressure and optionally including a center flag or the like containing advertising message or an indication of the units in which pressure is measured.

The invention also achieves its objects by providing a light weight, accessible collar which can contain an advertising message or an indication of tire pressure measuring units.

The manner in which the invention achieves its objects and other objects which are inherent in the invention will become more readily apparent when reference is made to the accompanying description of the preferred embodiments of the invention, and shown in the accompanying drawings wherein like numbers indicate corresponding parts throughout.

DESCRIPTION OF THE PREFERRED EMBODIMENTS OF THE INVENTION

While the present invention may be embodied in a number of forms, and while several of the features of the invention are optional and/or interchangeable, a description will be given of the preferred embodiments of the invention.

Figure 1:
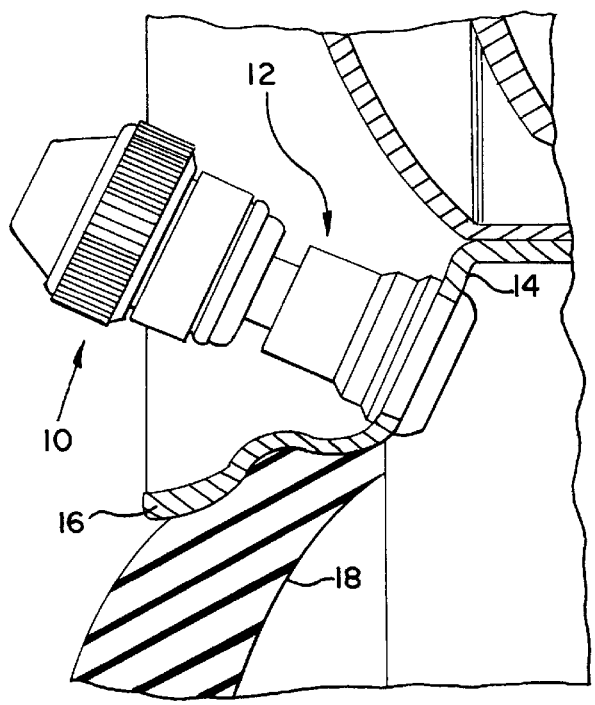
FIG. 1 is a view, partly in elevation and partly in section, showing the valve and cap incorporating the features of the invention, with the valve cap positioned in place within a portion of a tire rim.

Referring now to the drawings in greater detail, FIG. 1 shows a valve cap 10 of the invention. The cap is shown surmounting a valve assembly 12 in the shoulder portion 14 of a rim 16 containing a tire 18. The inventive concept is applicable to a number of other applications, but the invention will first be illustrated with respect to its use as the valve stem cap on an automobile tire.

Figure 2:
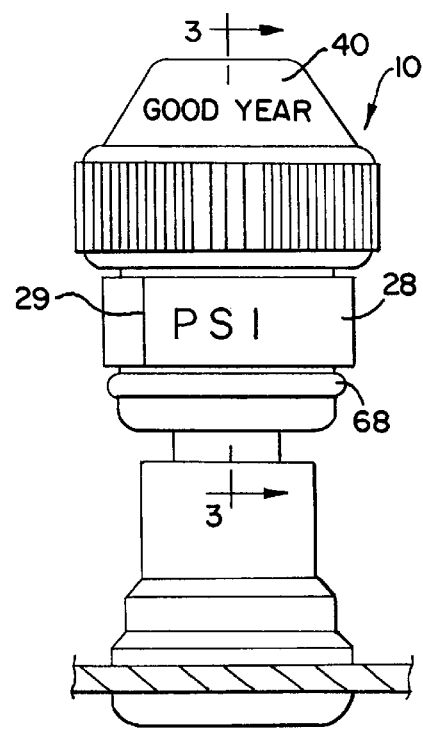
FIG. 2 is a side elevational view of a portion of the valve and valve cap incorporating several of the features of the invention.
Figure 3:
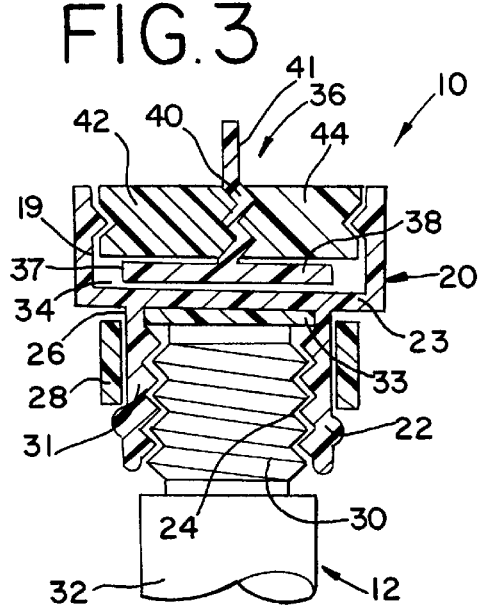
FIG. 3 is a vertical sectional view of a portion of the valve and valve cap of the present invention.

According to the invention, the cap 10 comprises a number of elements, as shown in FIGS. 2 and 3, for example. There is the valve cap 10, including sidewalls 19 defining a hollow cylindrical upper recess 20, and a reduced diameter sleeve 22 having threads 24 on the interior diameter thereof. A cylindrical display-receiving surface 26 is shown, and this surface is intended to receive a cylindrical display element 28. The interior threads 24 on the reduced diameter sleeve 22 are adapted to engage the threads 30 on the reduced diameter portion 31 of the valve assembly 32. A gasket 33 or the like may be inserted in the reduced diameter sleeve portion 22 of the cap 20 to prevent air leakage therefrom, if necessary.

An important part of the invention concerns the pressure-indicating elements which are to be placed into the recess 34. This recess 34 accommodates, among other things, a tray assembly generally designated 36. This tray assembly includes a pair of horizontally extending, generally semi-circular tray section portions 37, 38 and a vertical stem portion 40 surmounted by a flag portion 41. Left and right hand semi-circular insert portions 42, 44 respectively cover the left and right hand tray portions 37, 38 and secure them in place, as will be described.

In this connection, a clearance is shown between the bottom of the tray portions 37, 38 and the bottom surface 39 of the recess 34, and between the top surfaces of the tray and the bottom surfaces of the inserts for purposes of illustration. In actuality, it will be understood that there is little or no clearance between these parts, which snap together as a unit as will be described. Preferably, the plastic inserts are made from a material which is stiff, although somewhat elastic, enabling the parts to be snapped together and/or stretched slightly to achieve a desired friction fit.

Figure 4:
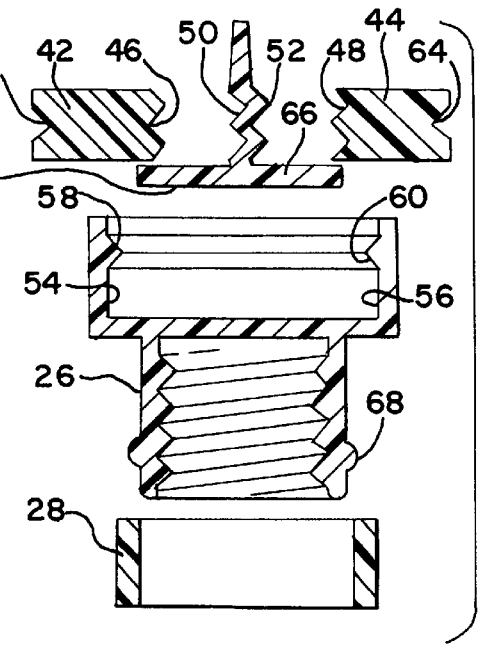
FIG. 4 is a vertical sectional view of the valve cap of FIG. 3 in exploded relation, showing the elements of one form of the invention prior to their assembly into the valve cap of the invention.

The tray assembly 36 normally accommodates two suitably chosen inserts 42, 44. These are placed on top of the tray assembly 40 (FIG. 4), with the left and right hand side insert portions 42, 44 having sawtooth edges 46, 48, and the left and right hand sides of the flag also having counterpart sawtooth edges 50, 52 or the like engaging formations so that, when all parts are placed together, they form a locked-together unit with the center portion of the tray assembly 36.

Likewise, the interior surfaces 54, 56 of the sleeve 20 contain sawtooth or other suitable formations 58, 60 which cooperate with the groove or like formations 62, 64 on the outside, curved surfaces of the inserts 42, 44 to prevent ready removal of the inserts once they have been snapped into the upper surface 64 of the tray 36 and the recess 34.

Thus, by placing the two selected portions 42, 44 together on top of the tray 36, their sawtooth formations 46, 48 interlock with their respective counterparts 50, 52 on the tray 36. Thereafter, the whole assembly, including the teeth 62, 64, engage the formations 58, 60 on the inner surfaces 54, 56 of the sidewall 19. With the proper manufacturing and assembly techniques, these units essentially become a unit when they are assembled and pressed into place in the recess portion 34 of the cap 10.

Referring again to the construction of the tray 36, the flag 40 may be sized or positioned in such a way as to provide the maximum display space when in position of use that is consistent with the concept of forming an upper extension of the stem. In general, the concept behind the stem 36 is that the inserts 42, 44 and the tray portion 36 should be able to be grasped with one hand. Thus, the flag 40 should be large enough to be grasped between a thumb and forefinger, and the unit including the tray 36 and the two pressure indicating inserts 42, 44 snapped into place within the hollow cylindrical recess 20 of the valve stem cap 10.

Referring now to the tray assembly 36, the flag portion 40 of this element may be selected so as to bear an advertising message or brand name. Goodyear, Firestone, Michelin or other tire brands, or in the alternative, an automotive brand name such as Fomoco or GM may be displayed. This flag 40 may also bear the name of an after-market wheel manufacturer such as Enkei or American Racing, for example. Alternatively, the flag could display the units of pressure in the application (psi, Kpa, etc.).

Figure 5:
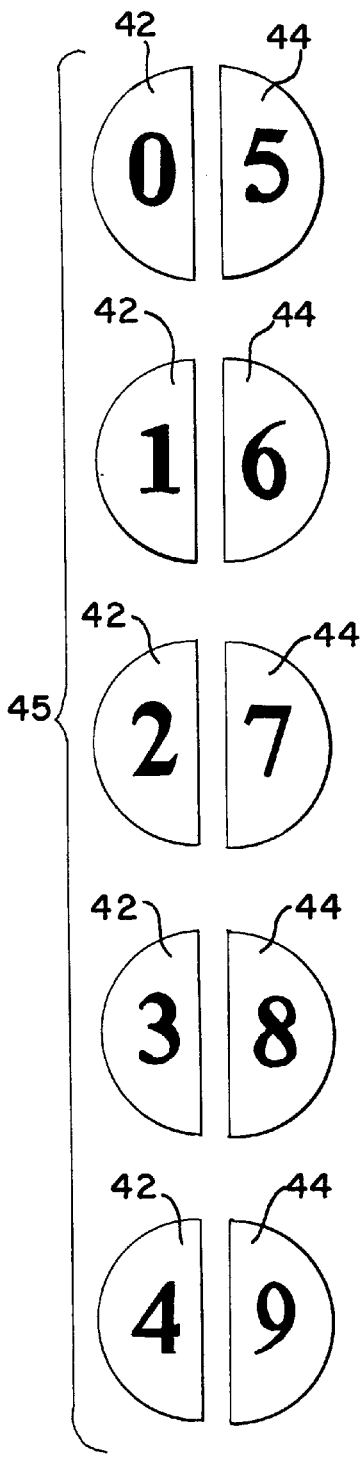
FIG. 5 is a elevational view of side 1 of a number card containing ten inserts to be used with the cap in designating an inflation pressure.
Figure 6:
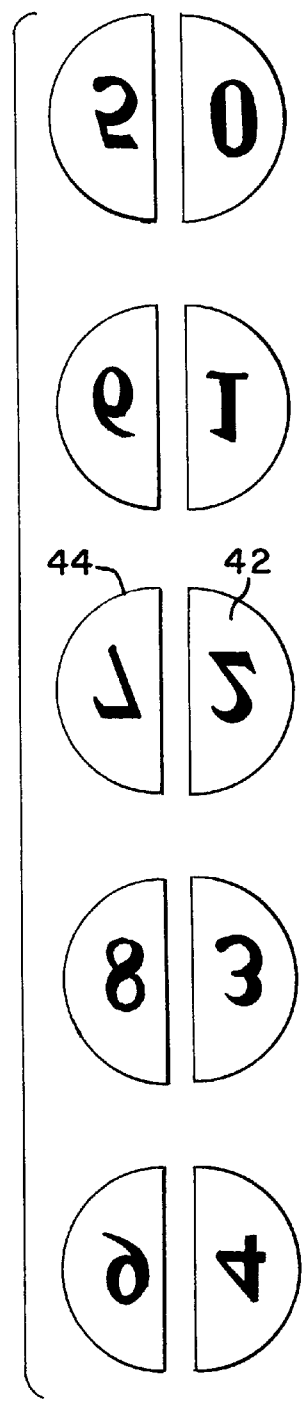
FIG. 6 is a view of side 2 of the number card taken from side 1.

Referring now to the FIGS. 5 and 6, a series of individual number displays are illustrated there as being present in the form of half-buttons 43 on a display card 45. For example, for each left and right hand display 42, 44, which are identical except for the numbers, offer a selection of from 01–99 from which a desired member may be chosen. For example, if the tire pressure to be indicated is 32 psi, the insert with the number 3 on its upwardly facing surface is selected and this half-button or insert 42 is positioned on the left hand side of the tray assembly 36. The number two cannot be used in the form shown on FIG. 5, because its left margin is curved instead of straight.

Therefore, a selection is made from the third entry from the top of side two. This button 43 bears the number "2" on its reverse side. When this half-button is selected and turned upside-down, the "2" is displayed with a curved right-side edge. The numbers are displayed on the half-buttons in the manner shown, thus insuring that all the numbers 1–99 may be selected. Other selections may be made accordingly.

Referring again to FIGS. 2–4 and 9, there is shown another feature of the invention. This feature comprises a sleeve or band 28 which is shown extending around the lower or display portion 26 of the valve cap which covers the valve threads. The display panel 26 is therefore covered in use with a legend contained on the labeled sleeve 28. The sleeve 28 may be slipped over the reduced diameter sleeve 26 from the bottom, and if sufficiently flexible, over the rib 68 which will thereafter hold it in place. This display band may either contain the units of pressure, such as psi, for example, or may contain the name of an advertiser, such as the tire or wheel maker. Customarily, the advertisement on the flag portion 40 will contain one legend and the band 28 will contain another legend.

The display element 28 may have a slit 29 therein, enabling it to be pulled slightly apart for purposes of snapping it over the rib or bead 68. This sleeve would typically be made from plastic, such as a relatively rigid thermoplastic of from 0.010" to about 0.048" in thickness. In the alternative, the element 28 may be made from a continuous sleeve of material which is inherently elastic enough to fit over the reduced diameter sleeve 26 and the rib 68 without permanent deformation. Other means of securing the display element into closely overlying relation to the panel 26, such as a built-in living hinge made from polypropylene or the like may be used.

Figure 7:
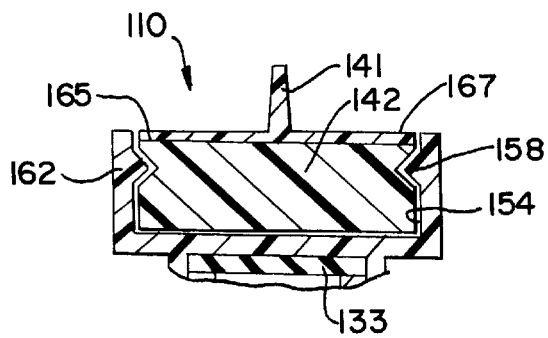
FIG. 7 is another embodiment of the invention showing the type of OEM installation according to the invention.

FIG. 7 shows the manner in which the invention could be practiced if it were to be used by an OEM manufacturer. Here, the insert 142 is made from one piece. The insert includes a groove 162 adapted to engage the rib 158 of the interior wall 154 of the cap unit 110. The flag 141 is shown as being integral with two top elements 165, 167. These number-bearing elements would each have one digit of the inflation displayed thereon. The flag would presumably contain a car maker's identity such as Ford or Dodge. In this way, a large number of caps 110 could be purchased by the OE manufacturer, who could then make the composite buttons 142 to reflect the desired tire pressure in large digits. The OE manufacturer would thus be required to have a large number of only a very few different-numbered buttons on hand, such as 32 and 35.

Figure 8:
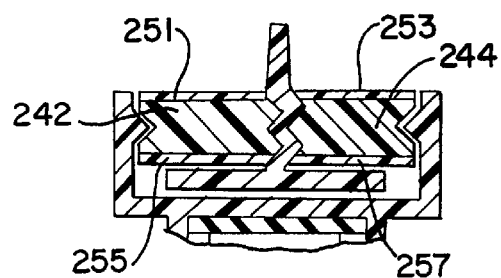
FIG. 8 is a vertical section view illustrating a form of the inserts of the invention.

FIG. 8 shows the manner in which separate elements 251, 253, 255, 257 would be used to display the inflation pressures. This illustrates that the left- and right-hand snap-in inserts 242, 244 are the same as their counterparts in FIGS. 3 and 4, except that the numbers are shown separately placed on them. That is, one number is placed on each side of each half-button 242, 244. In the event that these numbers were placed in a thin strip of film for example in the manufacturing process rather than being imprinted right on the material making up the inserts 242, 244, then the film would be placed on the inserts 142, 144. In other words, if the numbers were manufactured separately, they would then be placed on the half-button and then inserted in this manner.

Figure 9:
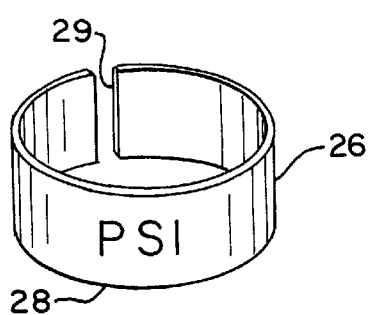
FIG. 9 is a perspective view of the display element adapted to be placed on the reduced diameter surface of the valve cap; and, FIG. 10 is an elevational view of a tether arrangement which may be used with the invention.

FIG. 9 is a perspective view of the display element 28 positioned on the display receiving surface. The collar element 26 has the legend 28 indicating pressure units on the element 26. An opening 29 between ends of the collar is shown, inasmuch as the preferred construction is a snap-on unit which may be enlarged to fit over the body of the reduced diameter portion of the cap.

Figure 10:
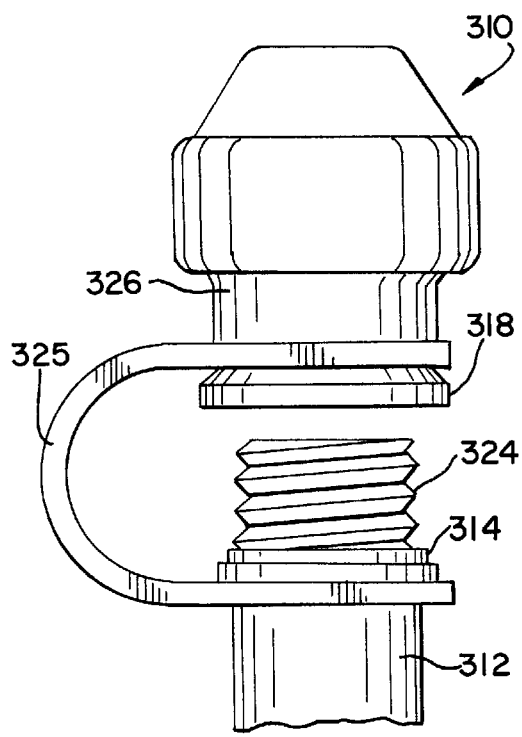

FIG. 10 shows a tether unit which may be used with the invention. Here, there is shown a valve stem in it 312 having a retainer in the form of an enlarged diameter bead or the like. This retainer 312 is disposed just below the threads 324 on the valve stem. The tether 325 extends between the top of the valve just beneath the threads and the lower or bead portion 368 on the reduced diameter portion 326 of the cap. The tether 325 is arranged for a sliding fit over the cap assembly generally designated 310 so that the cap may be freely turned relative to the tether. This insures that the cap will not be lost or that it will not be interchanged with another cap.

This tether arrangement could be important in the event that the rear tire pressure is different from the front, and all caps are both removed simultaneously. The use of different air pressures is not common on automobiles, but it does exist, and is quite common on sport-type motorcycles, for example. The remainder of the cap and stem portion are similar to their counterparts in the other examples.

It will thus be seen that the present invention provides an improved valve cap having a number of advantages and characteristics including those expressly pointed out here, and others which are inherent in the invention. Illustrative embodiments of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. A valve cap for an installation having interior air pressure supplied through a conventional tire valve, said cap comprising, in combination, an upper sleeve portion having a central recess for accommodating a pair of pressure indicating inserts, a pair of inserts received in said recess, and a lower sleeve portion that is internally threaded and adapted to mate with a tire valve assembly, said inserts being removable from said recess and each displaying, on its upwardly facing surface, one digit of a desired inflation pressure, said inserts having a formation thereon which enable them to be snapped snugly in place within said recess in back to back relation.

2. A valve cap as defined in claim 1, wherein said pair of inserts are adapted to cooperate with a central tray member, said tray member and said inserts being adapted to be snapped into position as a unit within said recess.

3. A valve cap assembly as defined in claim 2, wherein said inserts and said tray contain complementary contoured shapes whereby said inserts interlock with said tray in position of use.

4. A valve cap as defined in claim 1, said valve cap further including a tether affixed at one end to said valve cap and at another end on said tire valve assembly, said tether permitting free rotation of said cap relative to said tire valve.

5. A valve cap as defined in claim 2, in which said tray further includes a flag extending upwardly from an area between said inserts, said flag being adapted to carry an informational message.

6. A cap adapted to be situated atop a tire valve having an externally threaded portion on the shank thereof, said cap including a lower cylindrical, internally threaded portion for engaging said threads on the exterior of said tire valve, an upper portion including a central hollow recess, said recess including, on its inner surfaces therein, at least one rib formation, a pair of insert portions of substantially equal size and having their rear surfaces aligned in mutually engaging relation, a numbered digit on each insert able to be seen from the to surface of the insert portion, and a groove for engaging said rib being formed in the outer surface of said inserts, said rib and groove being constructed and arranged so that the inserts may be snapped into said recess.

7. A valve cap as defined in claim 6, which further includes a tether attaching said valve cap to said valve assembly, said cap permitting free rotary movement of said cap with respect to said valve.

8. A valve cap as defined in claim 6 in which said inserts include a tray member between them, said tray member including surfaces complementary to said insert rear surfaces, whereby said inserts and said t ray form a unit to be snapped into place with said recess.

9. A valve cap as defined in claim 8 wherein said tray includes a flag portion externally above the surface of said inserts, said flag being adapted to carry an advertising message.

10. A valve cap including a lower portion having threads on the interior thereof adapted to mate with the threads on the exterior of the valve assembly, and an upper portion having side walls forming an inner recess and a contoured surface on the interior of said side walls, a tray member having two laterally extending lower portions and a vertically extending stem portion, said stem portion being contoured so as to engage and retain a pair of inserts when said inserts are nestled snugly against said stem, and a pair of inserts adapted to be carried temporarily by said tray portion, said inserts each having thereon one digit of the two-digit pressure to be displayed by said valve cap and said units having rear surface contoured portions of said stem portion and exterior surfaces complementary to said contoured interior surfaces of said recess-forming side walls, whereby said inserts and said tray, when installed in said recess will snap into place and display a desired inflation pressure with a digit on each side of said stem.

11. A valve cap as defined in claim 10 wherein said tray member includes a flag portion extending upwardly from said stem portion, said flag portion being intended to carry an advertising or inflation unit message, said flag extending above the portion of said tray engaged by said inserts.

12. A valve cap as defined in claim 10 which further includes, on the exterior of said lower portion of said valve cap, a band surrounding said lower portion, said band being adapted to display the units of inflation.

13. A valve cap as defined in claim 10 wherein said lower portion includes a band extending around said lower portion, said band being made from a plastic material and being adapted to snap into position of use.

14. A valve cap as defined in claim 13 wherein said lower portion includes a sleeve portion on which a message may be displayed and a portion spaced therebeneath, said second portion including a rib to prevent the sleeve from coming axially off said valve cap.

15. A valve cap as defined in claim 10 which further includes a tether permitting free rotational movement of said cap.

16. A valve cap for an installation having interior air pressure supplied through a conventional tire valve, said cap comprising, in combination, an upper sleeve portion having walls defining a central recess for accommodating a pressure indicating insert, a pressure indicating insert snapped into place and held in said recess by cooperation between a formation in said recess-forming walls and a cooperating formation on said insert, and a lower sleeve portion that is internally threaded and adapted to mate with a tire valve assembly, said insert displaying, on its upwardly facing surface, the desired inflation pressure to be maintained inside said tire valve.

17. A valve cap as defined in claim 16, which further includes a tether for attaching said valve cap to said valve assembly, said tether permitting fee rotation of said valve cap when said valve cap is installed.

\* \* \* \* \*